United States Patent
Seefried et al.

(10) Patent No.: US 10,875,252 B2
(45) Date of Patent: Dec. 29, 2020

(54) SPORTING GOODS AND METHODS FOR INTERCONNECTING COMPONENTS OF A SPORTING GOOD

(71) Applicant: adidas AG, Herzogenaurach (DE)

(72) Inventors: Andreas Johannes Seefried, Veitsbronn (DE); Clemens Paul Dyckmans, Erlangen (DE); Maximilian Philipp Kurtz, Würzburg (DE)

(73) Assignee: adidas AG, Herzogenaurach (DE)

( * ) Notice: Subject to any disclaimer, the term of this patent is extended or adjusted under 35 U.S.C. 154(b) by 139 days.

(21) Appl. No.: 15/846,771

(22) Filed: Dec. 19, 2017

(65) Prior Publication Data
US 2018/0169960 A1  Jun. 21, 2018

(30) Foreign Application Priority Data

Dec. 20, 2016 (DE) .................... 10 2016 225 623

(51) Int. Cl.
*B29C 65/14* (2006.01)
*A43B 9/20* (2006.01)
(Continued)

(52) U.S. Cl.
CPC ........ *B29C 65/1496* (2013.01); *A43B 1/0072* (2013.01); *A43B 3/0078* (2013.01);
(Continued)

(58) Field of Classification Search
CPC ..... B33Y 10/00; B33Y 80/00; B29C 65/1422; B29C 65/1496; B29C 65/1412; B29C 65/1416; B29C 65/1432; B29C 66/1122; B29C 66/532; B29C 66/71; B29C 66/723; B29C 66/727; B29C 66/73921;
(Continued)

(56) References Cited

U.S. PATENT DOCUMENTS

| 5,522,954 A | 6/1996 | Bennett et al. |
| 6,432,320 B1 | 8/2002 | Bonsignore et al. |

(Continued)

FOREIGN PATENT DOCUMENTS

| AT | 505333 | 12/2008 |
| CN | 1087573 | 6/1994 |

(Continued)

OTHER PUBLICATIONS

Chinese Application No. 201711385586.8, Office Action dated Nov. 27, 2019, 30 pages (15 pages of English translation and 15 pages of Original document).
(Continued)

*Primary Examiner* — Vishal I Patel
(74) *Attorney, Agent, or Firm* — Kilpatrick Townsend & Stockton LLP

(57) ABSTRACT

The present invention relates to a method for interconnecting components of a sporting good, in particular a sports shoe, and a sports shoe manufactured with such a method. The method may include (a.) forming a pattern element having at least one removable at least partially non-transparent or non-reflective portion, (b.) irradiating at least one of the first and the second component via the pattern element with heat radiation and (c.) interconnecting the irradiated first and second component.

19 Claims, 3 Drawing Sheets

(51) Int. Cl.
*A43D 25/20* (2006.01)
*B29C 65/00* (2006.01)
*A43B 1/00* (2006.01)
*A43B 3/00* (2006.01)
*A43B 5/00* (2006.01)
*B29D 35/10* (2010.01)
*B29L 31/50* (2006.01)
*B33Y 10/00* (2015.01)
*B33Y 80/00* (2015.01)
*B29K 701/12* (2006.01)

(52) U.S. Cl.
CPC .......... *A43B 5/00* (2013.01); *A43B 9/20* (2013.01); *A43D 25/20* (2013.01); *B29C 65/1412* (2013.01); *B29C 65/1432* (2013.01); *B29C 66/1122* (2013.01); *B29C 66/532* (2013.01); *B29D 35/10* (2013.01); *B29C 65/1416* (2013.01); *B29C 65/1419* (2013.01); *B29C 65/1422* (2013.01); *B29C 66/71* (2013.01); *B29C 66/723* (2013.01); *B29C 66/727* (2013.01); *B29C 66/73921* (2013.01); *B29K 2701/12* (2013.01); *B29L 2031/504* (2013.01); *B29L 2031/505* (2013.01); *B33Y 10/00* (2014.12); *B33Y 80/00* (2014.12)

(58) Field of Classification Search
CPC ............ B29C 65/1419; B29K 2701/12; B29K 2075/00; B29K 2077/00; B29K 2067/00; B29K 2023/00; B29K 2023/06; B29K 2023/12; B29K 2067/003; B29K 2067/006; B29K 2023/22; B29K 2023/16; B29K 2096/04; B29K 2021/003; A43B 3/0078; A43B 1/0072; A43B 5/00; A43B 9/20; A43D 25/20; B29L 2031/505; B29L 2031/504; B29D 35/10
See application file for complete search history.

(56) References Cited

U.S. PATENT DOCUMENTS

| | | | |
|---|---|---|---|
| 7,992,243 | B2 | 8/2011 | Cook et al. |
| 8,302,649 | B2 | 11/2012 | Bol |
| 8,747,584 | B2 | 6/2014 | Knapp |
| 9,027,623 | B2 | 5/2015 | Schip |
| 2007/0033750 | A1 | 2/2007 | Cook et al. |
| 2008/0066240 | A1 | 3/2008 | Zhan |
| 2010/0181026 | A1 | 7/2010 | Bol |
| 2011/0079350 | A1 | 4/2011 | Lee et al. |
| 2011/0265241 | A1 | 11/2011 | Shiue |
| 2012/0272899 | A1 | 11/2012 | Makover et al. |
| 2013/0255103 | A1 | 10/2013 | Dua et al. |
| 2013/0295212 | A1 | 11/2013 | Chen et al. |
| 2014/0000043 | A1 | 1/2014 | Boardman et al. |
| 2014/0000044 | A1 | 1/2014 | Boardman et al. |
| 2014/0223673 | A1 | 8/2014 | Wardlaw et al. |
| 2014/0243442 | A1 | 8/2014 | Coles et al. |
| 2014/0275306 | A1 | 9/2014 | Watkins et al. |
| 2015/0054200 | A1 | 2/2015 | Fruth |
| 2015/0079521 | A1* | 3/2015 | Benson, Jr. ......... B29C 35/0888 430/296 |
| 2015/0210052 | A1 | 7/2015 | Wulff |
| 2016/0227876 | A1 | 8/2016 | Le et al. |
| 2016/0262489 | A1 | 9/2016 | Holmes et al. |

FOREIGN PATENT DOCUMENTS

| | | | |
|---|---|---|---|
| CN | 1295673 | | 5/2001 |
| CN | 1591778 | | 3/2005 |
| CN | 103561930 | | 2/2014 |
| CN | 103978620 | | 8/2014 |
| CN | 104028758 | | 9/2014 |
| CN | 104334043 | | 2/2015 |
| CN | 105856551 | | 8/2016 |
| DE | 1914537 | | 4/1965 |
| DE | 3437786 | | 4/1986 |
| DE | 19633467 | | 2/1998 |
| DE | 19648804 | | 5/1998 |
| DE | 19654860 | | 5/1998 |
| DE | 19754834 | | 6/1999 |
| DE | 19860611 | | 3/2000 |
| DE | 69811251 | | 1/2004 |
| DE | 102004049060 | | 6/2005 |
| DE | 102011108744 | | 1/2013 |
| DE | 102012206094 | | 10/2013 |
| DE | 102013012515 | | 3/2014 |
| DE | 102013002519 | | 8/2014 |
| DE | 102015202014 | | 8/2016 |
| EP | 0470705 | | 2/1992 |
| EP | 1016354 | | 7/2000 |
| EP | 922559 | | 3/2005 |
| EP | 1990170 | | 11/2008 |
| EP | 2202051 | | 6/2010 |
| EP | 2764972 | | 8/2014 |
| EP | 2862467 | | 4/2015 |
| EP | 2865289 | | 4/2015 |
| EP | 2921907 | | 9/2015 |
| EP | 3053471 | | 8/2016 |
| EP | 3053471 | A1 * | 8/2016 ............... A43B 9/12 |
| FR | 1207226 | | 2/1960 |
| JP | 51112882 | | 10/1976 |
| JP | 52136054 | | 11/1977 |
| JP | 57106031 | | 7/1982 |
| JP | 2000190394 | | 7/2000 |
| JP | 2001047519 | | 2/2001 |
| JP | 2007165362 | | 6/2007 |
| JP | 2012517535 | | 8/2012 |
| JP | 2014158708 | | 9/2014 |
| JP | 2014531352 | | 11/2014 |
| JP | 2015522936 | | 8/2015 |
| JP | 2016140763 | | 8/2016 |
| WO | 9851464 | | 11/1998 |
| WO | 9956578 | | 11/1999 |
| WO | 2004059390 | | 7/2004 |
| WO | 2009027078 | | 3/2009 |
| WO | 2011020599 | | 2/2011 |
| WO | 2012099784 | | 7/2012 |
| WO | 2014150122 | | 9/2014 |
| WO | 2015170330 | | 11/2015 |

OTHER PUBLICATIONS

European Application No. 17207310.8, Office Action dated May 16, 2019, 7 pages.
Japanese Application No. 2017242297, Office Action dated Mar. 26, 2019, 6 pages (English translation provided).
European Patent Application 17207310.8, Extended European Search Report dated Apr. 13, 2018, 8 pages.
German Patent Application No. 102016225623.8, Office Action, dated Nov. 14, 2017, 5 pages.
European Patent Application No. 17207310.8, Office Action dated Jan. 27, 2020, 6 pages.
Unpublished U.S. Appl. No. 16/933,238, filed Jul. 20, 2020.
German Patent Application No. 102016225623.8, Office Action dated Sep. 7, 2020, 10 pages (English machine translation provided).
Chinese Patent Application No. 201711385586.8, Office Action, dated Aug. 4, 2020, 30 pages (machine English translation provided).

* cited by examiner

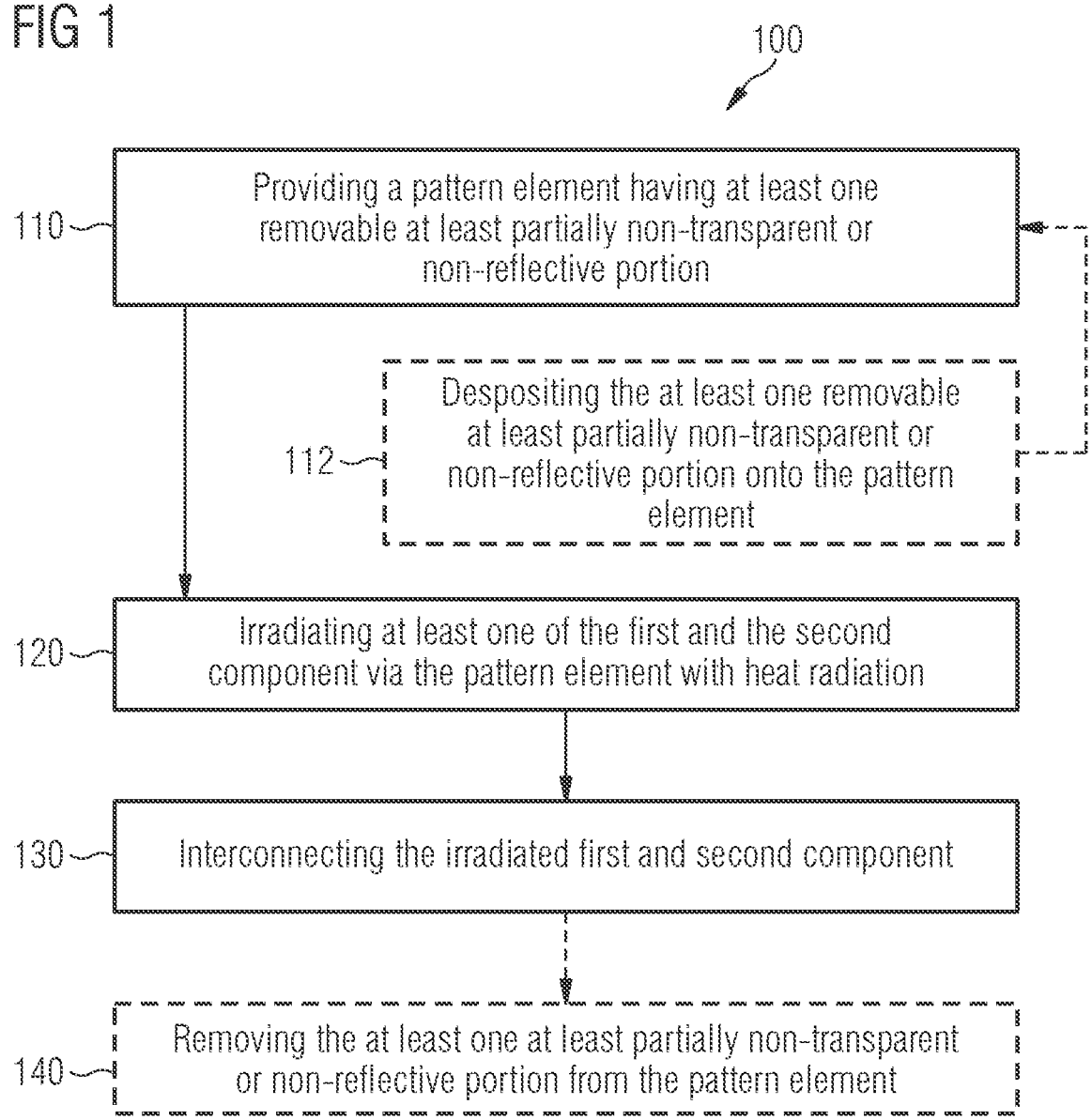

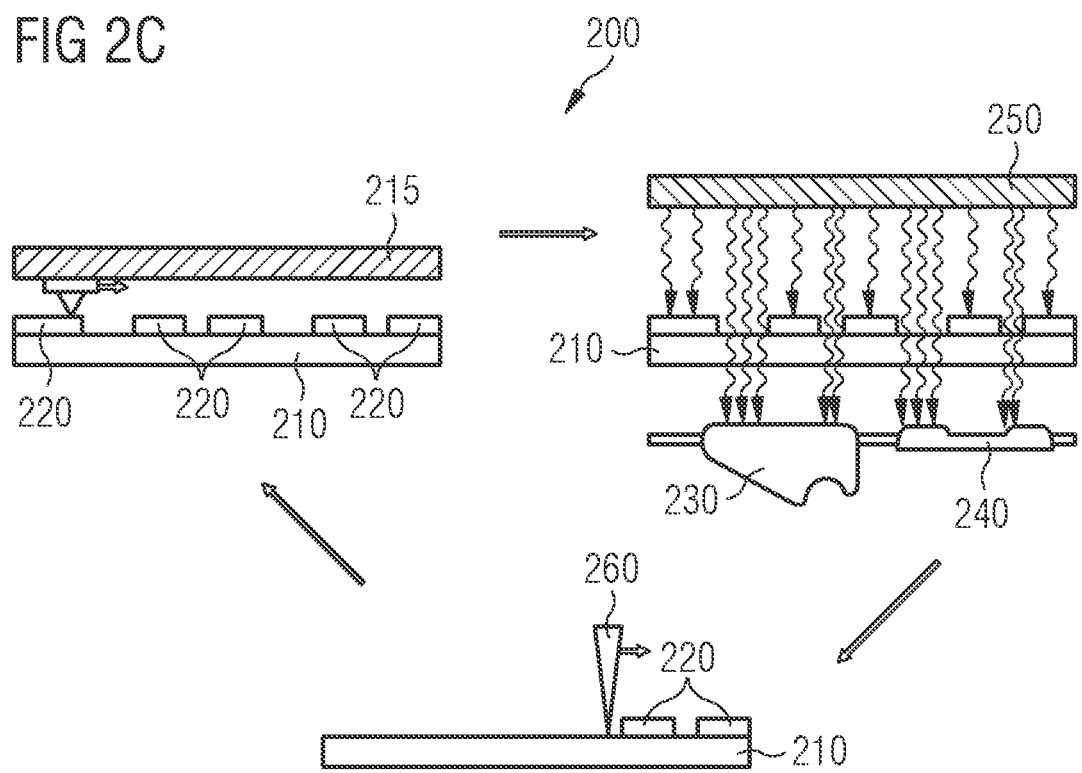
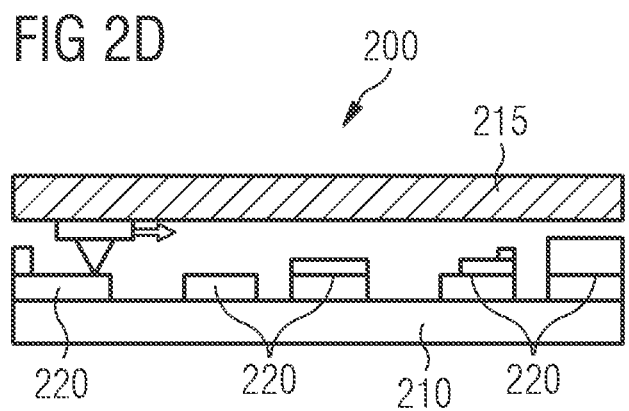

SPORTING GOODS AND METHODS FOR INTERCONNECTING COMPONENTS OF A SPORTING GOOD

CROSS REFERENCE TO RELATED APPLICATION

This application is related to and claims priority benefits from German Patent Application No. DE 10 2016 225 623.8, filed on Dec. 20, 2016, entitled METHOD FOR INTERCONNECTING COMPONENTS OF A SPORTING GOOD AND SPORTING GOODS THEREBY ("the '623.8 application"). The '623.8 application is hereby incorporated herein in its entirety by this reference.

FIELD OF THE INVENTION

The present invention relates to a method for interconnecting components of a sporting good, in particular a sports shoe, a sports shoe manufactured with such a method, as well as an apparatus for performing such method.

BACKGROUND

In manufacturing sporting goods, for example sports shoes or sports clothing, it is often necessary to permanently interconnect individual components. Such components of sporting goods frequently comprise plastic materials. This must be taken into consideration when selecting a suitable method for interconnecting the components.

One option is to interconnect the components mechanically, for example by screwing or riveting the components. However, this may be undesirable, for example with respect to the look of the sporting good, its weight or the durability or resilience of the interconnection.

A further possibility is to glue the components together. This option may be undesirable, for example, because gluing may require complex pretreatment of the components. It may, for example, be necessary, particularly in the case of plastic components, to first roughen and prime the surfaces of the components and to pre-dry the adhesive used for interconnecting the components in an oven. In addition, adhesives used for the gluing of plastic components are often harmful or environmentally hazardous.

In particular for interconnecting plastic components, various method possibilities have been used, for example using heat energy. Such methods are known from WO 2009/027078 A1, WO 2011/020599 A2, US 2015/0054200 A1, EP 0470705 A2 and WO 98/51464. Further reference in this regard is disclosed in WO 2004/059390 A2, US 2013/0295212 A1, WO 2015/170330 A1 and CN 104028758.

Moreover, applicant has disclosed in EP 3053471 A1 a method for the manufacture of sporting goods, in particular a shoe, wherein the method comprises the steps of providing a first component with a first connection surface and a second component with a second connection surface, activating at least one portion of the first connection surface by providing heat energy without contact, and connecting the first component with the second component by joining the first connection surface and the second connection surface.

However, a common drawback of these methods is that they cannot account for the potentially different material properties and different geometries of the different components as well as that they are still very complicated and labor intensive.

Therefore, one objective of the present invention is to provide improved methods and apparatuses for the interconnecting components of a sporting good in order to at least partly overcome the above mentioned deficiencies.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a method for interconnecting a first component and a second component of a sporting good, comprising the following steps: forming a pattern element having at least one removable at least partially non-transparent or non-reflective portion; irradiating at least one of the first component and the second component via the pattern element with heat radiation; and interconnecting the first component and the second component.

In certain embodiments, the method comprising at least one of the following steps: depositing the at least one removable at least partially non-transparent or non-reflective portion onto the pattern element; and removing the at least one removable at least partially non-transparent or non-reflective portion from the pattern element.

In some embodiments, depositing the at least one removable at least partially non-transparent or non-reflective portion onto the pattern element is carried out by at least one of the following methods: an additive manufacturing method, an inkjet printing method, a laser printer method, and a toner method.

The pattern element, in certain embodiments, comprises a thickness from 0.1 mm to 6 mm.

The pattern element, in some embodiments, comprises a thickness from 0.5 mm to 2 mm.

In certain embodiments, the pattern element comprises a substantially transparent plate, wherein the substantially transparent plate is a glass plate being at least partially transparent for the heat radiation.

In some embodiments, the pattern element comprises a mirror.

The at least one removable at least partially non-transparent or non-reflective portion, in certain embodiments, comprises a plurality of layers.

The plurality of layers, in some embodiments, comprises at least one 3D shape.

In certain embodiments, the at least one removable at least partially non-transparent or non-reflective portion comprises at least two materials having different values for transmissivity or reflectivity.

In some embodiments, the at least one removable at least partially non-transparent or non-reflective portion comprises one material having at least two sections with different values for transmissivity or reflectivity.

The at least two sections, in certain embodiments, comprise different thicknesses.

The at least two sections, in some embodiments, comprise different material densities.

In certain embodiments, the first and the second component of the sporting good comprise at least one of the following: a sole unit, a midsole, an outsole, an outsole element, a sole plate, a shoe upper, and a functional element.

In some embodiments, the heat radiation is provided by at least one heat source, wherein the at least one heat source is by an infrared radiation, IR-radiation, originating from at least one IR-radiation source.

The at least one removable at least partially non-transparent or non-reflective portion, in certain embodiments, comprises at least one of the following: a powder, a granulate, a liquid with or without solid particles, and an emulsion.

The sporting good, in some embodiments, comprises a sports shoe.

According to certain embodiments of the present invention, a pattern element comprising at least one removable at least partially non-transparent or non-reflective portion, wherein the pattern element is capable of being irradiated by heat radiation.

BRIEF DESCRIPTION OF THE DRAWINGS

In the following detailed description, embodiments of the invention are described referring to the following figures:

FIG. 1 is a flow diagram illustrating exemplary method steps for interconnecting a first and a second component of a sporting good, in particular a sports shoe, according to certain embodiments of the present invention.

FIG. 2C is a schematic diagram illustrating a method according to certain embodiments of the present invention.

FIG. 2D is a schematic diagram illustrating a method step according to certain embodiments of the present invention.

BRIEF DESCRIPTION

Figure 2A:
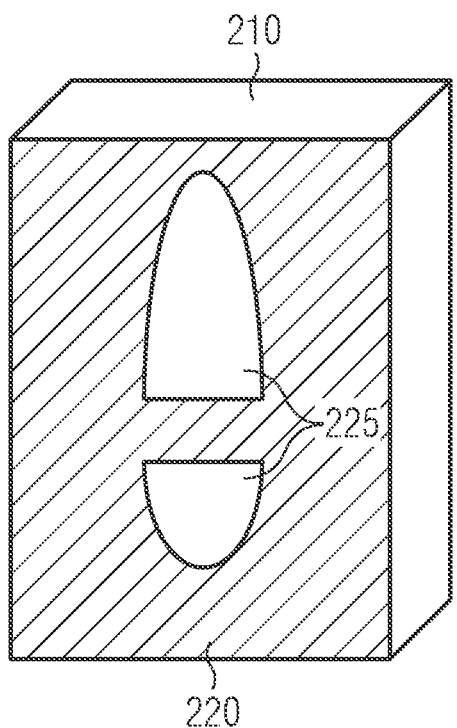
FIGS. 2A and 2B are top views of a pattern element having at least one removable at least partially non-transparent or non-reflective portion according to certain embodiments of the present invention.

The above mentioned problem is at least partly solved by a method for interconnecting a first and a second component of a sporting good, in particular of a sports shoe, comprising the following steps: (a.) providing a pattern element having at least one removable at least partially non-transparent or non-reflective portion; (b.) irradiating at least one of the first and the second component via the pattern element with heat radiation; and (c.) interconnecting the irradiated first and second component.

Whereas in the references mentioned above interconnecting a first and a second component of a sporting good, for example a shoe upper and a sole for a sports shoe, is carried out by merely providing heat energy to the entire surface of the components, the present invention is based on a different approach. Here, a pattern element having at least one removable at least partially non-transparent or non-reflective portion provides that the shoe upper and the sole may be irradiated more precisely via the heat radiation in order to activate only certain surface regions of the components which will be interconnected, e.g. bonded, cured, or welded together, in a later interconnecting step as explained below. For example in the case of non-transparent portions, the pattern element being at least partially transparent for the used heat radiation may be arranged between the two components and the energy source for the heat radiation so that certain portions of the shoe upper and the sole cannot melt due to the non-transparent portions. Thus, such a method step may prevent any distortions of the surfaces of the two components. If, for example, one of the two components comprises a different material with different material properties such as the melting point, the at least partially non-transparent or non-reflective portions may absorb and/or reflect the heat radiation. Thus, they can gradually attenuate the heat radiation depending on their geometry. In some embodiments, the non-transparent or non-reflective portions cannot transmit any heat radiation towards the two components. Additionally or alternatively, in the case of non-reflective portions, the pattern element may be arranged in such a way that the heat radiation of the energy source may be reflected selectively towards at least one of the two components.

Moreover, the at least one non-transparent or non-reflective portions may be arranged removably onto the pattern element, so that the size of the at least one non-transparent or non-reflective portion, e.g. a powder, a granulate, a liquid with or without solid particles, or an emulsion, may be changed easily corresponding to different sizes of the components to be interconnected of due to other changes. For example, if the sporting good is a sports shoe and the two components are a shoe upper and a sole, the method may thus provide an optimized interconnecting process. For different integer sizes of the European size system (Paris points) like for example 36, 38, 40, 42, 44 and so on, the non-transparent or non-reflective portions may be arranged removably onto the pattern element and may be removed when other components having another size, geometry or shape will be interconnected. Moreover, there is no further need for a plurality of different shutting elements compared to the methods previously known. Therefore, the claimed invention significantly simplifies the process of interconnecting components of a sporting good, in particular of a sports shoe.

Furthermore, the method according to present invention may provide an improved method for interconnecting irradiated components, e.g. a shoe upper and a sole, as the portions of the components which have to be irradiated and thus have to be heated up for the interconnecting process, may be smaller. This may lead to a shorter cooling down process of the interconnected components. Therefore, the whole manufacturing process of the sporting good may be more efficient, and the improved method according to the invention may provide that the activation temperature provided to different portions of the two components may be adjusted easily so that the two components may be interconnected without wasting an excessive amount of energy.

In some embodiments, the method may further comprise at least one of the following steps: (d.) depositing the at least one removable at least partially non-transparent or non-reflective portion onto the pattern element; and (e.) removing the at least one at least partially non-transparent or non-reflective portion from the pattern element. Moreover, the step (d.) of depositing may be carried out by at least one of the following methods: an additive manufacturing method, an inkjet printing method or a laser printer and/or toner method. Such embodiments may significantly simplify the process of interconnecting components of a sporting good. For example, if a printhead of an inkjet printer or a laser printer may be used, the at least one removable at least partially non-transparent or non-reflective portion may be deposited very easily and quickly onto the pattern element.

Additionally or alternatively, the at least one at least partially non-transparent or non-reflective portion may be also removed very quickly so that components having different sizes may be interconnected. Moreover, these method steps may be performed in one apparatus or may be performed at different entities to provide a high degree of flexibility and automation in the interconnecting process.

The pattern element may comprise a thickness from 0.1 mm to 6 mm, and, in some embodiments, from 0.5 mm to 2 mm. The inventors have determined, on the one hand, the pattern element should not be too thick so that too much energy from the heat radiation may be absorbed and on the other hand, the pattern element should not be too thin so that the at least one removable at least partially non-transparent or non-reflective portion may be securely arranged. Therefore, the inventors have found that such values for the thickness of the pattern element may provide a good compromise between providing sufficient energy in the form of heat radiation to the components and long-lasting stability of the pattern element in the interconnecting process.

In some embodiments, the pattern element may comprise an essentially transparent plate, in particular a glass plate being at least partially transparent for the used heat radiation. Glass may provide a suitable base material in the case of at least partially non-transparent or non-reflective portions as it is cheap and is easy to handle with heat radiation, for example, infrared (IR) radiation. Moreover, a glass plate may be printed easily with the at least one removable at least partially non-transparent or non-reflective portion onto its surface. Additionally or alternatively, after the irradiating step (b.), the at least one removable at least partially non-transparent or non-reflective portion may be easily removed mechanically by a tool, for example a wiper, from the glass plate which may then be used again very quickly for the interconnecting step of two other components having another size.

In some embodiments, the pattern element may comprise a mirror. Especially in the case of at least partially non-reflective portions arranged onto the pattern element, a mirror may simplify the irradiation step of the first and second component as a mirror is cheap and easy to handle. For example, the heat radiation may be reflected by the mirror towards the first and/or the second component and the at least partially non-reflective portions may provide no heat radiation to certain portions of the first and/or second component which should be not heated. Therefore, using a mirror may provide more flexibility in the arrangement of the apparatus parts so that the whole interconnecting process may be optimized. Additionally or alternatively, the mirror may also be used as at least partially non-transparent portions arranged onto the pattern element, wherein the heat radiation may be reflected away by the mirror instead of absorbing the heat radiation as mentioned above.

In some embodiments, the at least one removable at least partially non-transparent or non-reflective portion may comprise a plurality of layers, in some embodiments forming at least one 3D shape. Such embodiments provide that the at least one removable non-transparent or non-reflective portion may gradually attenuate the heat radiation and may therefore absorb different amounts of energy of the heat radiation. Heat radiation may comprise different wavelengths corresponding to different kinds of radiations, for example in the case of IR radiation: near-infrared, short-wavelength infrared, mid-wavelength infrared, long-wavelength infrared and far-infrared. Thus, a first layer may absorb a certain wavelength of IR radiation, a second layer may absorb another wavelength of IR radiation and so on which is quite similar to a Bragg mirror. Therefore, such embodiments provide that only certain amounts of energy corresponding to certain material properties of the first and second component may be provided to them and thus the choice of the energy source may be neglected.

In some embodiments, the at least one removable at least partially non-transparent or non-reflective portion may comprise at least two materials having different values for transmissivity or reflectivity. Such embodiments provide that certain amounts of heat radiation may be selectively provided to the first and second component to be interconnected at the same time. For example in case of a sports shoe, a shoe upper to be interconnected with a sole at its bottom surface may comprise a different thickness in the heel part compared to the forefoot part, so that the two parts of the shoe upper need different amounts of heat radiation. Undesired dissipation of heat energy in other parts of the shoe upper or sole can also be avoided or at least limited.

In some embodiments, the at least one removable at least partially non-transparent or non-reflective portion may comprise one material having at least two sections with different values for transmissivity or reflectivity. Moreover, the at least two sections may comprise different thicknesses or different material densities. Such embodiments follow the same idea of gradually attenuating or providing different amounts of heat radiation to certain parts of the first and second component as mentioned above.

In some embodiments, the first and the second component of the sporting good may comprise at least one of the following: a sole unit, a midsole, an outsole, an outsole element, a film or foil material, a sole plate, a shoe upper, and a functional element.

In some embodiments, the heat radiation may be provided by at least one heat source, in particular by an infrared radiation, IR-radiation, originating from at least one IR-radiation source.

In some embodiments, the at least one removable at least partially non-transparent or non-reflective portion comprises at least one of the following: a powder, a granulate, a liquid with or without solid particles, or an emulsion. The optical characteristics of the liquid or the emulsion, for example, may be easily changed so that the process cycle may be accelerated and therefore the whole interconnecting process may be further optimized.

According other aspects, the present invention relates to a method for manufacturing a sport shoe, comprising a method according to the invention for interconnecting a shoe upper and a sole.

According to still other aspects, the present invention relates to a sports shoe manufactured with a method according to the present invention.

According to yet still other aspects, the present invention relates to a pattern element comprising at least one removable at least partially non-transparent or non-reflective portion, wherein the pattern element may be adapted to be irradiated by heat radiation in a method according to the present invention. Moreover, the present invention relates to an apparatus for performing a method according to the present invention, wherein the apparatus comprises such a pattern element.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Some embodiments and variations of the present invention are described in the following with particular reference to a sporting good, in particular a sports shoe. However, the concept of the present invention is not limited to these embodiments. The method described herein may identically or similarly be applied to the manufacture of any sporting goods in general, such as, for example, sports clothing or sports equipment such as rackets, wherein different components are interconnected to each other by interconnecting methods, for example bonding, curing, welding, etc. Moreover, the present invention may also be applied to manufacturing methods, wherein any components are interconnected to each other by the interconnecting methods, for example bonding, curing, welding, etc.

It is also to be noted that individual embodiments of the invention are described in greater detail below. However, it is clear to the person skilled in the art that the constructional possibilities and optional features described in relation to these specific embodiments may be further modified and combined with one another in a different manner within the scope of the present invention and that individual steps or features can also be omitted where they appear to be unnecessary to the skilled person. In order to avoid redundancies, reference is made to the explanations in the previous sections, which also apply to the embodiments of the following detailed description.

FIG. 1 presents a flow diagram illustrating exemplary method steps 100 for interconnecting a first component and a second component of a sporting good, in particular a sports shoe, in accordance with certain aspects of the present disclosure. The method steps 100 may be performed, for example, by at least one interconnecting entity which may be part of at least one manufacturing entity as may be seen in FIG. 2C and/or FIG. 2D. The method steps 100 may begin at step 110 with providing a pattern element having at least one removable at least partially non-transparent or non-reflective portion. For example, the pattern element may comprise an essentially transparent plate, in particular a glass plate being at least partially transparent for the used heat radiation. Moreover, the pattern element may comprise a mirror.

In some embodiments, the first and the second component of the sporting good may comprise at least one of the following: a sole unit, a midsole, an outsole, an outsole element, a film or foil material, a sole plate, a shoe upper, and a functional element.

As shown in FIG. 1, step 110 may comprise the step 112 of depositing the at least one removable at least partially non-transparent or non-reflective portion onto the pattern element. This method step may be carried out by at least one of the following methods: an additive manufacturing method, an inkjet printing method or a laser printer and/or toner method. As an additional benefit, the additive manufacturing method may provide more precisely the at least one removable at least partially non-transparent or non-reflective portion onto the pattern element and the inkjet printing method, the laser printer and/or toner method may be faster. In some embodiments, multiple or all methods may be used simultaneously or a combination thereof in order to optimize the whole interconnecting process of the first and second component of a sporting good.

The method 100 continues with a step 120 of irradiating at least one of the first and second component via the pattern element with heat radiation. For example, the surface of the first component may comprise a material that becomes adhesive when subjected to a certain amount of heat energy or a material that enters into a chemical reaction with a material of the surface of the second component when heated above a certain activation temperature. Such materials can have the benefit that they are easily handled when not activated and only become adhesive/reactive selectively upon activation.

Method 100 continues with a step 130 of interconnecting the irradiated first and second component. Interconnecting the irradiated first component with the irradiated second component may further comprise forming a bond between at least one portion of the surface of the first component and at least one portion of the surface of the second component. The bond may comprise a chemical bond and/or a mechanical bond. What kind of bond is formed and how stable this bond is will for example depend on the amount of heat energy provided, the temperature of the surface the first component is heated to, the degree of activation, the materials involved, the kind of post-processing or curing, and so forth.

As shown in FIG. 1, the method steps 100 may further comprise a step 140 of removing the at least one removable at least partially non-transparent or non-reflective portion from the pattern element. In addition, such a method step enables that new at least one removable at least partially non-transparent or non-reflective portions may be deposited onto the pattern element corresponding to different sizes of the first and second component of a sporting good as mentioned above.

As a result, the method 100 reduces the overall process time, the labor costs as well as the manufacturing costs for manufacturing a sporting good, in particular a sports shoe, wherein a shoe upper and a sole are interconnected.

Figure 2B:
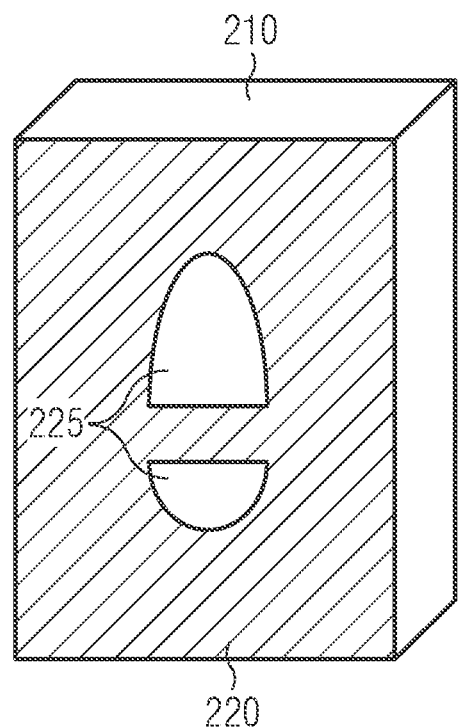

FIGS. 2A and 2B present a top view of two exemplary embodiments of a pattern element 210 having at least one removable at least partially non-transparent or non-reflective portion 220.

The pattern element 210 may comprise a thickness from 0.1 mm to 6 mm. In some embodiments, the pattern element 210 may comprise a thickness from 0.5 mm to 2 mm. As mentioned above, such values for the thickness of the pattern element 210 may provide a good compromise between providing sufficient energy in the form of heat radiation to the first and second component and long-lasting stability of the pattern element 210 in the interconnecting process of components sporting goods, in particular sports shoes, and in the overall process of manufacturing such sporting goods, in particular such sports shoes. In some embodiments, another thickness for the pattern element 210 may be used corresponding to other wavelengths of the heat radiation. For example, ultraviolet (UV) radiation may be used in order to provide more energy for activating surfaces of the first and second component and/or colorizing different material portions of the first and second component. Moreover, the thickness of the pattern element 210 may also be chosen to provide a lens being concave and/or convex which may focus or diffuse the rays of the heat radiation and may thus provide more or less energy to the first and second component. Moreover, the pattern element 210 may comprise an essentially transparent material, in particular a glass plate being at least partially transparent for the used heat radiation, with the same benefits as mentioned above. In some embodiments, other specialized glasses or glass ceramics may be used being transparent for the used heat radiation such as radiation in the infrared, IR, wavelength range.

As may be seen in FIGS. 2A and 2B, the pattern element 210 has at least one removable at least partially non-transparent or non-reflective portion 220 (displayed as hatched portion in FIGS. 2A and 2B). This at least one removable at least partially non-transparent or non-reflective portion 220 may comprise at least one of the following: a plurality of layers, in some embodiments, forming at least one 3D shape, at least two materials having different values for transmissivity or reflectivity, and one material having at least two sections with different sections for transmissivity or reflectivity, wherein the at least two sections may comprise different thicknesses and/or may comprise different material densities.

The at least one removable at least partially non-transparent or non-reflective portion 220 may comprise at least one of the following: a powder, a granulate, a liquid or an emulsion. Moreover, different materials comprising different colors may also be suitable to provide different values for transmissivity or reflectivity.

All of these embodiments for the pattern element 210 provide at least one at least partially transparent opening 225 (or at least partially reflecting opening for another configuration) through which the first and the second component of the sporting good, in particular the sports shoe, may be irradiated so that the first and second component of the sporting good may be interconnected as mentioned above. In FIG. 2A, the two at least partially transparent openings 225 may be transparent for heat radiation being destined to a heel part and a forefoot part of a shoe upper and/or a sole. The shoe upper and/or the sole may have a certain integer size of the European size system (Paris points). In some embodiments, the shoe upper and/or the sole may have a certain shape and/or material.

In FIG. 2B, the two at least partially transparent or reflective openings 225 may also be transparent for heat radiation being destined to a heel part and a forefoot part of another shoe upper and/or another sole, wherein the shoe upper and/or the sole may have another certain integer size, in particular having a smaller integer size than the shoe upper and/or the sole in FIG. 2A. If no pattern element 210 would be used for the interconnecting process of the first and the second component of a sporting good, too much heat energy may be provided to the components which may result in the destruction of their surfaces. Therefore, the claimed invention may quickly change the corresponding removable at least partially non-transparent or non-reflective portions 220 onto the pattern element 210 during the process of interconnecting the components of a sporting good.

FIG. 2C presents a schematic circle diagram illustrating a method according to the present invention, such as the method steps 100, which may be performed by at least one manufacturing entity 200. For example, in a first method step, for example according to method step 110 of FIG. 1, the pattern element 210 may be provided having at least one at least partially non-transparent or non-reflective portion 220, wherein the at least one at least partially non-transparent or non-reflective portion 220 may be deposited onto the pattern element 210 by a printhead 215. In the embodiments of FIG. 2C, five removable at least partially non-transparent or non-reflective portions 220 are deposited onto the pattern element 210 but is not limited to this number of portions 220. The printhead 215 may be used during an additive manufacturing method, an inkjet printing method or a laser printer and/or toner method. Moreover, the printhead 215 may be controlled by a computer program and/or by at least one human worker. Furthermore, this method step may be performed by an entity which may be included in the interconnecting entity or may be a separate entity which feed multiple interconnecting entities.

As may be seen in FIG. 2C, in a second method step, for example according to method step 120 of FIG. 1, a first component 230 and a second component 240 of a sporting good, in particular a sports shoe, may be arranged below the pattern element 210. For example, the first component 230 may be a shoe upper and the second component 240 may be a sole.

Generally, the first component and/or the second component may comprise at least one of the following materials: thermoplastic polyurethane (TPU), a polyamide (PA) such as PA4.10, PA6, PA6.6, PA6.10, PA10.10, PA11 or PA12, a polyetherblockamide (PEBA), a co-polyester, a polyolefin such as a polyethylene (PE) or polypropylene (PP), polyethylene terephthalate (PET), polybutylene terephthalate (PBT), a polyolefin elastomer (POE) such as polyisobutylene (PIB), ethylene propylene rubber (EPR) or ethylene propylene diene monomer (M-class) rubber (EPDM), a block copolymer such as an olefin block copolymer (OBC).

The first component and/or the second component may comprise a foamed or expanded material such as, for example, expanded thermoplastic polyurethane (eTPU), an expanded polyamide (ePA) and/or an expanded polyetherblockamide (ePEBA).

The first component and/or the second component may comprise particles of an expanded material, for example particles of eTPU and/or ePA and/or ePEBA. The particles may be randomly arranged or they may, at least partially, be aligned or otherwise intentionally arranged. The particles may be connected at their surfaces.

The benefits of using a foamed or expanded material may include the increased insulating properties of such materials, allowing the temperature at the surface to be increased while the temperature inside the components remains rather low such that undesired effects on these regions by the heat energy may be avoided or limited.

It is mentioned, in some embodiments, that the materials mentioned above as materials for the first and the second component may also be materials for the first component. The first component and/or the second component may form one integral component of the same material(s). As an example, the second component may be made from particles of an expanded material, e.g. particles of eTPU.

A second component comprising or made of particles of an expanded material may be well suitable for, for example, a midsole due to the particularly good elastic properties and the low weight of the particles. However, such second components may also be employed for other types of sporting goods, for example, for components that assume a dampening function, such as knee or elbow protectors.

The surface(s) of the first component and/or the second component may also have a material composition different from the rest of the two components or parts of the two components to better meet the specific requirements for forming a durable connection with their respective interconnecting surfaces. The first component may, for example, comprise multiple layers with a first connection surface being formed by one of these layers at a surface of the first component. The first connection surface may furthermore comprise a mixture of different materials and may itself comprise multiple layers to allow a very precise control of the activation process. Similar statements apply to the second component and its corresponding second connection surface.

The first component and/or the second component may comprise at least one of the following: a sole unit, a midsole, an outsole, an outsole element, a sole plate, a film or foil material, a shoe upper, and a functional element.

A functional element may, for example, comprise at least one of the following: a stabilizing element, a torsion bar, a heel cap, and so forth.

Embodiments of the inventive method may for example be used to connect a midsole of a shoe to a shoe upper, a midsole to a functional element (e.g., stability elements), a functional element (e.g., a heel cap) to a shoe upper, a midsole to an outsole, an outsole to a functional element (e.g., a torsion bar), or to connect film or foil materials to various components (e.g. to a midsole, upper or outsole) for structural or visual reasons.

Returning back to the method step, for example according to method step 120 of FIG. 1, the first component 230 and the second component 240 are irradiated via the pattern element 210, especially via the portions being transparent, with heat radiation provided by at least one heat source 250, in particular IR-radiation source.

In a still further method step, for example according to method step 140 of FIG. 1, the at least one at least partially non-transparent or non-reflective portion 220 are removed from the pattern element 210 by a tool 260, for example by a wiper. In some embodiments, any other appropriate mechanical tool may be used to remove the at least one removable at least partially non-transparent or non-reflective portion 220 from the pattern element 210. After this method step, the pattern element 210 may be provided again with at least one at least partially non-transparent or non-reflective portion 220 by the printhead 215. Additionally or alternatively, the reflective portions may be reused or recycled for another interconnection method step 130.

FIG. 2D presents an alternative first method step according to the present invention. Here, the at least one at least partially non-transparent or non-reflective portion 220 comprises a plurality of layers, in some embodiments, forming at least one 3D shape, e.g. five 3D shapes. The five 3D shapes may be deposited onto the pattern element 210 by a printhead 215 as mentioned above.

As may be seen schematically in FIG. 2D, the 3D shape on the left side comprises two layers having different widths and the same thickness, the next 3D shape comprises one layer as mentioned in FIG. 2C, the 3D shape in the middle comprises two layers having the same width and different thicknesses, the next 3D shape comprises three layers having three different widths and the same thickness and the 3D shape on the right side comprises two layers having the same width and different thicknesses. Many other suitable 3D forms may be used in order to provide a desired distribution of the heat radiation to the surfaces of the two components to be interconnected.

In the following, further examples are described to facilitate the understanding of the invention:

Example 1

Method (100) for interconnecting a first (230) and a second (240) component of a sporting good, in particular of a sport shoe, comprising the following steps: providing (110) a pattern element (210) having at least one removable at least partially non-transparent or non-reflective portion (220); irradiating (120) at least one of the first (230) and the second (240) component via the pattern element (210) with heat radiation; and interconnecting (130) the irradiated first (230) and second (240) component.

Example 2

Method (100) according to the preceding Example, further comprising at least one of the following steps: depositing (112) the at least one removable at least partially non-transparent or non-reflective portion (220) onto the pattern element (210); removing (140) the at least one removable at least partially non-transparent or non-reflective portion (220) from the pattern element (210).

Example 3

Method (100) according to the preceding Example, wherein the depositing step (112) is carried out by at least one of the following methods: an additive manufacturing method, an inkjet printing method or a laser printer and/or toner method.

Example 4

Method (100) according to one of the preceding Examples, wherein the pattern element (210) comprises a thickness from 0.1 mm to 6 mm, preferably from 0.5 mm to 2 mm.

Example 5

Method (100) according to one of the preceding Examples, wherein the pattern element (210) comprises an essentially transparent plate, in particular a glass plate being at least partially transparent for the used heat radiation.

Example 6

Method (100) according to one of the preceding Examples, wherein the pattern element (210) comprises a mirror.

Example 7

Method (100) according to one of the preceding Examples, wherein the at least one removable at least partially removable non-transparent or non-reflective portion (220) comprises a plurality of layers, preferably forming at least one 3D shape.

Example 8

Method (100) according to one of the preceding Examples, wherein the at least one removable at least partially non-transparent or non-reflective portion (220) comprises at least two materials having different values for transmissivity or reflectivity.

Example 9

Method (100) according to one of the preceding Examples, wherein the at least one removable at least partially non-transparent or non-reflective portion (220) comprises one material having at least two sections with different values for transmissivity or reflectivity.

Example 10

Method (100) according to the preceding Example, wherein the at least two sections comprise different thicknesses.

Example 11

Method (100) according to one of the Examples 9 or 10, wherein the at least two sections comprise different material densities.

Example 12

Method (100) according to one of the preceding Examples, wherein the first (230) and the second (240) component of the sporting good comprise one or more of the following: a sole unit, a midsole, an outsole, an outsole element, a sole plate, a shoe upper, a functional element.

Example 13

Method (100) according to one of the preceding Examples, wherein the heat radiation is provided by at least one heat source (250), in particular by an infrared radiation, IR-radiation, originating from at least one IR-radiation source.

Example 14

Method (100) according to one of the preceding Examples, wherein the at least one removable at least partially non-transparent or non-reflective portion (220) comprises at least one of the following: a powder, a granulate, a liquid with or without solid particles, or an emulsion.

Example 15

Method for manufacturing a sports shoe, comprising a method of one of the preceding Examples for interconnecting a shoe upper (230) and a sole (240).

Example 16

Sports shoe, manufactured with a method according to Example 15.

Example 17

Pattern element (210) comprising at least one removable at least partially non-transparent or non-reflective portion (220), wherein the pattern element (210) is adapted to be irradiated by heat radiation in a method of one of the Examples 1-15.

Example 18

Apparatus for performing a method according to one of the Examples 1-15, wherein the apparatus comprises the pattern element of Example 17.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A method for interconnecting a first component and a second component of a sporting good, the method comprising:
   irradiating at least one of the first component and the second component via a pattern element with heat radiation, wherein:
   the pattern element at least partially covers at least one of the first component or the second component,
   the pattern element comprises a plate having at least one substantially transparent region and at least one removable element, wherein the at least one removable element is formed of at least partially non-transparent material, and
   the removable element is positioned to at least partially overlap the at least one substantially transparent region of the plate; and
   interconnecting the first component and the second component.

2. The method of claim 1, wherein the at least one removable element is at least partially non-reflective.

3. The method of claim 1, further comprising depositing the at least one removable element onto the pattern element.

4. The method of claim 3, wherein depositing the at least one removable element onto the pattern element comprises at least one of the following methods: an additive manufacturing method, an inkjet printing method, a laser printer method, and a toner method.

5. The method of claim 3, further comprising removing the at least one removable element from the pattern element.

6. The method of claim 1, wherein the pattern element comprises a thickness from 0.1 mm to 6 mm.

7. The method of claim 1, wherein the pattern element comprises a thickness from 0.5 mm to 2 mm.

8. The method of claim 1, wherein the plate is a glass plate being at least partially transparent for the heat radiation.

9. The method of claim 1, wherein the pattern element comprises a mirror.

10. The method of claim 1, wherein the at least one removable element comprises a plurality of layers.

11. The method of claim 10, wherein the plurality of layers form at least one 3D shape.

12. The method of claim 1, wherein the at least one removable element comprises at least two materials having different values for at least one of transmissivity and reflectivity.

13. The method of claim 1, wherein the at least one removable portion element comprises one material having at least two sections with different values for at least one of transmissivity and reflectivity.

14. The method of claim 13, wherein the at least two sections comprise different thicknesses.

15. The method of claim 13, wherein the at least two sections comprise different material densities.

16. The method of claim 1, wherein the first and the second component of the sporting good comprise at least one of the following: a sole unit, a midsole, an outsole, an outsole element, a sole plate, a shoe upper, and a functional element.

17. The method of claim 1, wherein the heat radiation is provided by at least one heat source, wherein the at least one heat source comprises infrared radiation originating from at least one IR-radiation source.

18. The method of claim 1, wherein the at least one removable element comprises at least one of the following: a powder, a granulate, a liquid, and an emulsion.

19. The method of claim 1, wherein the sporting good comprises a sports shoe.

* * * * *